Figure 1:
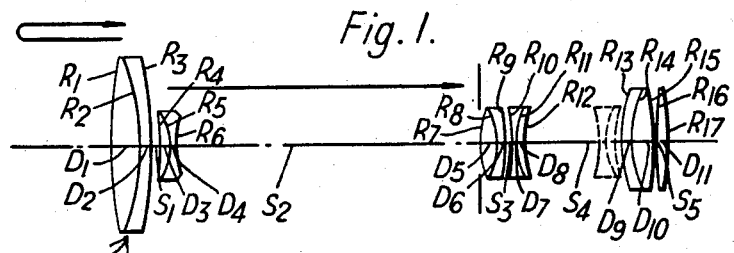

March 19, 1963    G. H. COOK    3,081,671

OPTICAL OBJECTIVES OF VARIABLE FOCAL LENGTH

Filed July 14, 1960 independently movable for focusing

Inventor
GORDON H. COOK
By Holcombe, Wetherill + Brisebois
Attorneys 3,081,671
OPTICAL OBJECTIVES OF VARIABLE FOCAL
LENGTH
Gordon Henry Cook, Leicester, England, assignor to
Rank Precision Industries Limited trading as Taylor,
Taylor & Hobson, Leicester, England, a company of
Great Britain
Filed July 14, 1960, Ser. No. 42,941
Claims priority, application Great Britain July 14, 1959
16 Claims. (Cl. 88—57)

This invention relates to an optical objective for photographic or other purposes, having relatively movable members, whereby the equivalent focal length of the objective can be varied whilst maintaining constant position of the resultant image plane of the objective throughout the range of relative movement. Various types of such variable focal length objective are known, many of which have front and rear assemblies, of which the rear assembly is stationary and the relatively movable members are included in the front assembly. It is often desirable in such objectives to be able to change the range of focal length variation. This can be effected by substitution of one stationary rear assembly for another, but this usually demands a new position for the main bulk of the objective in order to obtain the same resultant image plane, and this becomes particularly troublesome in the case of objectives of large size.

It should be made clear that the terms "front" and "rear" are herein used in accordance with the usual convention to relate to the sides of the objective respectively nearer to and further from the longer conjugate.

The present invention has for its object to provide an improved variable focal length objective, wherein not only is this difficulty avoided, but also the change of range of focal length variation is effected without necessity for substituting one rear assembly for another.

The variable focal length optical objective according to the present invention has front and rear assemblies, of which the front assembly includes members relatively movable for effecting variation of the equivalent focal length of the objective whilst maintaining constant position of the resultant image plane of the complete objective throughout the range of relative movement, and the rear assembly includes a convergent stationary rear member, and a divergent member located in front of such rear member and adjustable from one to the other of two preset positions in which such divergent member has the same conjugates, whereby in such two preset positions of the divergent member the relative movement of the members of the front assembly will produce two different ranges of variation of the equivalent focal length of the complete objective with the same position of the resultant image plane, the magnifications of the divergent member of the rear assembly in its two preset positions respectively being $\sqrt{M}$ and $1/\sqrt{M}$, where M is the ratio between the equivalent focal lengths of the objective in the two ranges. Usually, the rear assembly will include, in addition to the stationary rear member and the adjustable divergent member, a stationary front member whose equivalent power lies between $\frac{2}{3}$ and $\frac{3}{2}$ times the positive value of the expression $$\left[\frac{1}{d} - \frac{1}{f_m(1+\sqrt{M})}\right]$$

where $f_m$ is the equivalent focal length of the adjustable divergent member, and $d$ is the distance of the image formed by the front assembly from the front surface of the rear assembly (such distance being reckoned positive if the said image is in front of such front surface and negative if it is behind such front surface whilst an equivalent focal length is reckoned positive if convergent and negative if divergent). In some instances, it may be convenient to make the front surface of the stationary front member of the rear assembly aspheric in order to achieve a high degree of correction for higher order spherical aberration.

When the image formed by the front assembly lies in front of the front surface of the rear assembly, the front member of the rear assembly is conveniently convergent and to control spherical aberration may comprise a doublet component having a dispersive internal contact. When, however, such image lies behind the front surface of the rear assembly, such front member may be less powerful and in some cases may consist of a simple element or even be dispensed with altogether.

It should be made clear that the term "internal contact" as used herein is intended to include both an internal cemented contact surface and a "broken" contact, that is a contact formed by two closely adjacent surfaces differing in curvature by a small amount such that the contact can be assumed for calculation purposes to have an effective radius of curvature equal to the harmonic mean of the radii of curvature of the two surfaces forming such broken contact.

It is desirable for the equivalent focal length of the adjustable divergent member of the rear assembly to be relatively short in order to keep its movement small and thus avoid undesired increase in the length of the complete objective, but at the same time it is also desirable for avoiding excessive aberration to keep its relative aperture at a reasonable level. For this purpose, the product of the equivalent focal length $f_m$ of such divergent member multiplied by the $f$/number of the complete objective should preferably lie within specfied limits. In many cases it is convenient to define such limits in terns of the ratio $d/R$, the product lying between $d/R$ and $4d/R$, where R is the ratio between the equivalent focal lengths of the front assembly and of the complete objective (again utilising the sign convention specified above).

It will be appreciated, however, that this definition of the limits for the said product is applicable only when the equivalent focal length of the front assembly has a finite value, for if the front assembly is afocal, both $d$ and R are infinite and the ratio $d/R$ becomes indefinite. In such case, it may often be convenient to define the limits for the said product in terms of the equivalent focal length $F_R$ of the rear assembly, the product lying between $-F_R$ and $-4F_R$ (again utilising the sign convention specified above). Yet another form of definition is convenient in some circumstances, wherein the said product is defined as lying between 1 and 4 times the negative value of the square root of the product of the maximum and minimum values in the range of variation of the equivalent focal length of the complete objective.

Preferably, the adjustable divergent member in the rear assembly is substantially achromatic and includes at least one divergent element and at least one convergent element, the Abbe V number of the material of the divergent element (or each divergent element) exceeding that of the convergent element (or each convergent element) by at least 15, such adjustable divergent member having its front surface concave to the front and its rear surface convex to the front and including a collective internal contact, in order to control spherical aberration, coma, astigmatism and distortion. Conveniently such collective internal contact is convex to the front and has effective radius of curvature lying between ⅓ and ¾ of the numerical value of the equivalent focal length $f_m$ of the adjustable divergent member, the difference between the mean refractive indices of the materials of the elements bounding such internal contact lying between 0.2 and 0.05.

Preferably, the convergent rear member in the rear assembly is substantially achromatic and includes at least one convergent element and at least one divergent element, the Abbe V number of the material of the convergent element (or each convergent element) exceeding that of the divergent element (or each divergent element) by at least 20. Such convergent rear member, to control spherical aberration and distortion, may conveniently include a dispersive internal contact which is convex to the front and has effective radius of curvature lying between ⅓ and ¾ of the equivalent focal length of such rear member, the difference between the mean refractive indices of the materials of the elements bounding such internal contact lying between 0.25 and 0.05. Such convergent rear member will usually need to have relatively high power and it may conveniently comprise a doublet component followed by a simple element.

Figure 2:
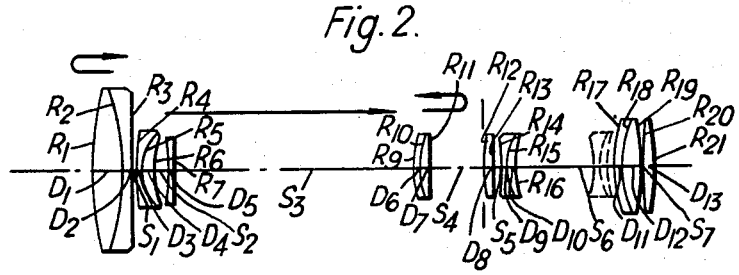
Figure 3:
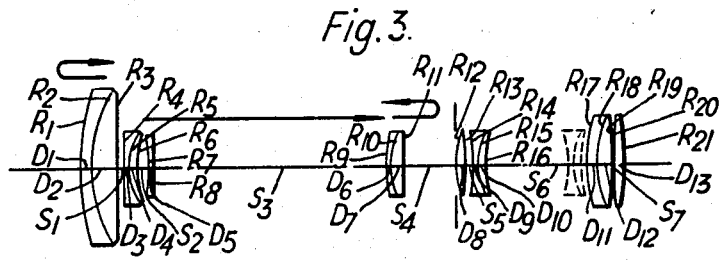

Three convenient practical examples of variable focal length objective according to the invention are illustrated respectively in FIGURES 1, 2 and 3 of the accompanying drawings and it should be mentioned that the second and third of these examples incorporate, not only the present invention, but also the features described in the specification of the present applicant's copending United States patent application Serial No. 53,413 and are in fact identical with examples set out in such specification.

Numerical data for these three examples are given in the following tables, in which $R_1$ $R_2$ . . . represent the radii of curvature of the individual surfaces of the objective, the positive sign indicating that the surface is convex to the front and the negative sign that it is concave thereto, $D_1$ $D_2$ . . . represent the axial thicknesses of the elements of the objective, and $S_1$ $S_2$ . . . represent the axial air separations between the components. The tables also give the mean refractive indices $n_d$ for the $d$-line of the spectrum and the Abbe V numbers of the materials used for the various elements of the objective, and in addition the clear diameters for the air-exposed surfaces of the objective.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

*Example I*

| Radius | Thickness or Air Separation | Refractive Index $n_d$ | Abbé V Number | Clear diameter |
|---|---|---|---|---|
| $R_1 = +3.6928$ | | | | 1.375 |
| | $D_1 = 0.25$ | 1.6176 | 52.70 | |
| $R_2 = -1.8342$ | | | | |
| | $D_2 = 0.075$ | 1.728 | 28.90 | |
| $R_3 = -5.6398$ | | | | |
| | $S_1 = $ variable | | | |
| $R_4 = 1.2475$ | | | | 0.575 |
| | $D_3 = 0.10$ | 1.7618 | 26.98 | |
| $R_5 = -0.5046$ | | | | |
| | $D_4 = 0.05$ | 1.65301 | 46.16 | |
| $R_6 = +1.6569$ | | | | 0.536 |
| | $S_2 = $ variable | | | |
| $R_7 = +1.2136$ | | | | 0.551 |
| | $D_5 = 0.125$ | 1.50759 | 61.16 | |
| $R_8 = -0.6991$ | | | | |
| | $D_6 = 0.05$ | 1.70035 | 30.28 | |
| $R_9 = -1.4255$ | | | | |
| | $S_3 = 0.05$ or $0.757$ | | | |
| $R_{10} = -1.1767$ | | | | 0.541 |
| | $D_7 = 0.04$ | 1.65695 | 50.81 | |
| $R_{11} = +0.4902$ | | | | |
| | $D_8 = 0.08$ | 1.7618 | 26.98 | |
| $R_{12} = +1.1905$ | | | | 0.549 |
| | $S_4 = 0.757$ or $0.05$ | | | |
| $R_{13} = +2.2482$ | | | | 0.793 |
| | $D_9 = 0.0625$ | 1.7618 | 26.98 | |
| $R_{14} = +0.8803$ | | | | |
| | $D_{10} = 0.1875$ | 1.60557 | 60.02 | |
| $R_{15} = -1.7943$ | | | | 0.801 |
| | $S_5 = 0$ | | | |
| $R_{16} = +12.7551$ | | | | 0.798 |
| | $D_{11} = 0.075$ | 1.5097 | 64.44 | |
| $R_{17} = -2.8927$ | | | | |

The dimensions of the variable air spaces in the front assembly are as follows:

| | $S_1$ | $S_2$ |
|---|---|---|
| $F = F_0$ | 0.0750 | 2.3486 |
| $F = \sqrt{F_0 F_m}$ | 1.6200 | 1.6576 |
| $F = F_m$ | 2.3111 | 0.1125 |

The linear dimensions in this table are given in terms of $F_0$, the minimum value of the equivalent focal length $F$ of the objective in the lower range of variation, the maximum value $F_m$ in such lower range being $5F_0$. In the higher range, the minimum and maximum values $F_0^1$ and $F_m^1$ are respectively $2F_0$ and $10F_0$, so that the ratio M between the equivalent focal lengths of the objective in the two ranges is equal to 2.

The relative aperture is $f/4.0$ in the first range and $f/8.0$ in the second range.

The back focal distance is $3.106F_0$.

The iris diaphragm is positioned $0.038F_0$ in front of the surface $R_7$ and its maximum diameter is $0.5425F_0$.

The semi-angular field covered varies from about 11½ degrees at minimum equivalent focal length $F_0$ in the first range to about 2½ degrees at maximum equivalent focal length $F_m$ in the first range, and from about 5¾ degrees at minimum equivalent focal length $F_0^1$ in the second range to about 1¼ degrees at maximum equivalent focal length $F_m^1$ in the second range.

The front assembly in this example comprise a front member in the form of a convergent doublet having equivalent focal length $f_1 = 4.278F_0$, and a rear member in the form of a divergent doublet having equivalent focal length $f_2 = -1.250F_0$ both members being movable in a manner now to be described.

The movements are identical for the two ranges of variation. In the initial position giving the lowest value $F_0$ or $F_0^1$ of the equivalent focal length of the objective, the air space $S_1$ between the two members has its lowest value $0.075F_0$, whilst the air space $S_2$ between the rear member and the rear assembly has its highest value $2.3486F_0$. In the final position at the other end of the range giving the highest value $F_m$ or $F_m^1$ of the equivalent focal length of the objective, the air space $S_1$ has its highest value $2.3111F_0$ and the air space $S_2$ its lowest value $0.1125F_0$. The backward movement of the rear member from its initial position to its final position, through the first range of variation to vary the equivalent focal length F of the objective from the initial value $F_0$ to the final value $F_m$, is given by the expression $$f_2(F-F_0)/\sqrt{F_0F_m}$$

and the corresponding expression for the second range of variation is $f_2(F-F_0^1)/\sqrt{F_0^1F_m^1}$, the two expressions being equal to one another since $F_0^1=2F_0$ and $F_m^1=2F_m$ whilst the value of F in any one position in the second range of movement is twice that in the same position in the first range of movement. During this backward movement of the rear member, the front member first moves forward and then moves back again to its initial position, the distance in the forward direction from the initial position being defined by the expression $$f_2(F-F_0)(F_m-F)/F\sqrt{F_0F_m}$$

or by the equal expression $$f_2(F-F_0^1)(F_m^1-F)/F\sqrt{F_0^1F_m^1}$$

The most forward position occurs when F is equal to $\sqrt{F_0F_m}$ in the first range of variation or to $\sqrt{F_0^1F_m^1}$ in the second range of variation, the actual distance from the initial or final position in the example being $0.854F_0$. It will be clear that, with these movements, the overall length of the objective is kept short throughout the ranges of variation.

The equivalent focal length of the divergent front assembly varies from $-1.913F_0$ to $-9.566F_0$ during the movement, its ratio to the equivalent focal length of the complete objective remaining constant throughout each range of variation.

The virtual image of the object formed by the front assembly occupies the same position relatively to the rear assembly in all operative positions, the distance d of such image position in front of the front surface $R_7$ of the rear assembly being equal to $4.216F_0$. It will thus be clear that the position of the image plane of the complete objective remains constant throughout the movements of the front assembly, but the size of the image changes progressively as the equivalent focal length of the objective changes.

In the foregoing description of the movements, it has been assumed that the object position remains unchanged at infinity, so that a further movement is required to accommodate change of object position. This can be achieved by superimposing on the movement an additional movement of the front member of the front assembly independently of the rear member of such assembly. This additional movement consists of a forward movement of the front member through a distance equal to $f_1^2/(d_o-f_1)$, where $d_o$ is the distance of the object in front of the front front nodal plane of the front member in its position of adjustment. Since this expression is independent of the equivalent focal length F of the complete objective, it will be clear that the main movements of the members of the front assembly to effect variation of equivalent focal length can be carried out in each and every position of adjustment of the front member to suit object distance, without affecting the final image position. This arises from the fact that in any one position of the rear member of the front assembly, the additional movement of the front member to suit object distance will not alter the position of the image formed by the front member relatively to the position of the rear member, so that the virtual image formed by the front assembly will always occupy the same position relatively to the rear assembly, not only throughout the movement to vary the equivalent focal length, but also throughout the additional movement of the front member to suit object distance. The two movements can readily be effected by a suitable mechanism interlinking the movement of the rear member of the front assembly with that of a carriage supporting the front member, such front member being adjustable on the carriage to suit object distance.

In order to maintain constant relative aperture throughout the movements in each of the two ranges and also to avoid objectionable vignetting of oblique rays, the clear diameters of all the surfaces of the front assembly are made greater than is necessary to accommodate the full axial beam for all settings of the iris diaphragm, which thus alone determines the relative aperture in all relative positions of the members.

The rear assembly comprises a stationary front member, an adjustable middle member and a stationary rear member. The front member consists of a convergent doublet having equivalent focal length $f_f=+1.602F_0$. The middle member consists of a divergent doublet having equivalent focal length $f_m=-F_0$. The rear member consists of a convergent doublet followed by a convergent simple element, and has equivalent focal length $f_r=+1.438F_0$.

The middle member is adjustable from one to the other of two preset positions, in one of which (as shown in dotted line in the drawing) it is close to the rear member, whilst in the other (as shown in full line) it is close to the front member. In these two positions the magnifications due to the middle member are respectively $\sqrt{M}$ and $1/\sqrt{M}$, and since in the example $M=2$, these magnifications are respectively 1.414 and 0.707. The middle member has the same conjugates in the two positions, the front conjugate distance in one position being equal to the back conjugate distance in the other position. Thus the two conjugate distances are $f_m(1+\sqrt{M})$ and $$f_m(1+\sqrt{M})/\sqrt{M}$$

that is in the example $2.414F_0$ and $1.707F_0$, and the distance between the two positions is equal to the difference between the two conjugate distances, that is $0.707F_0$. In this way, as has already been mentioned, it becomes possible to get two ranges of variation of the equivalent focal length of the objective, with the same image plane and without movement of the front and rear members of the rear assembly. The transfer from one range to the other can be quickly and easily effected, since it involves only the movement of the relatively light middle member through a fairly short distance from one operative position to the other.

The equivalent focal length of the adjustable middle member should be kept fairly short in order to keep its movement short, but at the same time its relative aperture must be reasonably high in order to avoid excessive aberration. The values chosen for the equivalent focal length and the diameter of this middle member in the example represent a reasonable compromise between these requirements, with reference to the type of movement used in the front assembly and the other characteristics of the front assembly. When the iris diaphragm is close to the front surface of the rear assembly, the diameter required for the front member of such assembly depends upon the distance d of the virtual image formed by the front assembly from the front surface of the rear assembly, upon the ratio R between the equivalent focal lengths of the front assembly and of the complete objective, and upon the f/number of the objective. The diameter required for the adjustable middle member of the rear assembly will be at a maximum in the front position of such member, when it will be approximately equal to that required for the front member of the rear assembly, and it therefore becomes possible (when using a front assembly of the kind above described) to define limits for the product of the equivalent focal length $f_m$ of such middle member and the f/number of the complete objective in terms of the ratio d/R, suitable values for such limits being between d/R and 4d/R. The actual value of the product in the example is $-4F_0$ for the lower range and $-8F_0$ for the higher range, whilst d/R has the value $-2.2F_0$ for the lower range and $-4.4F_0$ for the higher range. With other constructions of front assembly, it may not always be convenient to define such product in terms of the ratio $d/R$, and in such cases such product may be defined in terms of $d/R$, and it may be more convenient to define it in terms of the geometric means between the upper and lower ends of the focal length range, that is $\sqrt{F_0 F_m}$ for the lower range or $\sqrt{F_0^1 F_m^1}$ for the higher range, or in some instances in terms of the equivalent focal length of the rear assembly.

The equivalent focal length $f_t$ of the front member of the rear assembly must be such that, with its front conjugate at the position of the image formed by the front assembly, its rear conjugate will provide a convenient position for the front conjugate of the adjustable middle member. This will be achieved if $1/f_t$ lies between $\frac{2}{3}$ and $\frac{3}{2}$ times the value of the expression $$\left[\frac{1}{d} - \frac{1}{f_m(1+\sqrt{M})}\right]$$

In the example this expression has the value $0.651/F_0$, whilst $1/f_t$ has the value $0.624/F_0$.

The equivalent focal length $f_r$ of the rear member of the rear assembly is such as to focus the rear conjugate of the middle member at a convenient position for the final image plane and, with appropriate positioning of such image plane, can be selected to give any desired range for the equivalent focal length of the complete objective, subject to the condition that the relationship between the equivalent focal length of the complete objective and the resultant image size must not correspond to an angular field of view which cannot be accommodated by the front assembly. The value of $f_r$ in the example is $1.438F_0$.

It is to be noted that the equivalent focal length of the rear assembly does not change greatly when the middle member is moved from one position to the other, the two values thereof in the example being $1.900F_0$ for the shorter range and $2.173F_0$ for the longer range.

In the example, the divergent middle member of the rear assembly consists of an achromatic doublet having a divergent element in front of a convergent element, the Abbe V number of the material of the divergent element exceeding that of the convergent element by about 24. The internal contact in this member is collective and convex to the front, the difference between the mean refractive indices of the materials of the two elements being 0.105.

The rear member of the rear assembly in the example is achromatic and consists of a convergent doublet followed by a convergent simple component, the doublet having a divergent element in front of a convergent element made of a material whose Abbe V number exceeds that of the divergent element by about 33. The internal contact in the doublet is dispersive and convex to the front, with radius $0.8803F_0$, which is 0.612 times the equivalent focal length of the rear member. The difference between the mean refractive indices of the materials of the two elements in the doublet is 0.156.

The front member of the rear assembly in the example takes the form of a convergent doublet having a dispersive internal contact, the front element being convergent and made of a material whose Abbe V number exceeds and whose mean refractive index is less than those of the divergent rear element.

The second and third examples differ from the first primarily in that the front assembly is differently arranged and incorporates two further features incorporated in the copending application Serial No. 53,413 above mentioned. According to one of such features, an optical objective of variable focal length has a normally stationary rear assembly and a front assembly including members relatively movable under the control of a zoom control element for effecting variation of the equivalent focal length of the objective whilst maintaining constant position of the final image plane of the complete objective throughout the range of relative movement, such front assembly being substantially afocal throughout the range of movement and comprising three members, of which the front and rear members are convergent and are mechanically interconnected to perform approximately equal and opposite axial movements under the control of a cam mechanism actuated by the zoom control element, whilst the middle member is divergent and is caused to perform an axial movement which bears an approximately linear relationship to the movement of the zoom control element, the movement of the middle member and the movements of the front and rear members being so interrelated as to cause the equivalent focal length of the objective to vary in accordance with an approximately logarithmic law relatively to the movement of the zoom control element.

According to the other of such further features, an optical objective of variable focal length has members relatively movable under the control of a zoom control element for effecting variation of the equivalent focal length of the objective whilst maintaining constant position of the final image plane of the objective throughout the range of relative movement, such relatively movable members including a movable divergent member which is located in front of the diaphragm of the objective and behind at least one other member and receives from the member in front of it a converging beam, the axial travel of such divergent member for the complete range of variation of the equivalent focal length of the objective exceeding the equivalent focal length $f_2$ of the divergent member, the said divergent member comprising a divergent doublet component in front of a simple divergent component, the internal contact in such doublet component being strongly convex towards the front with radius of curvature lying numerically between $0.3f_2$ and $0.6f_2$, whilst the difference between the mean refractive indices of the materials of the two elements of the said doublet component is less than 0.04.

*Example II*

| Radius | Thickness or Air Separation | Refractive Index $n_d$ | Abbé V Number | Clear diameter |
|---|---|---|---|---|
| $R_1 = +2.3020$ | $D_1 = .2125$ | 1.65695 | 50.81 | 1.274 |
| $R_2 = -2.3020$ | $D_2 = .06875$ | 1.7618 | 26.98 | |
| $R_3 = -25.4945$ | $S_1 =$ variable | | | 1.221 |
| $R_4 = +3.0841$ | $D_3 = .04125$ | 1.691 | 54.80 | .603 |
| $R_5 = + .3886$ | $D_4 = .103$ | 1.674 | 32.00 | |
| $R_6 = + .9988$ | $S_2 = .103$ | | | .534 |
| $R_7 = -1.9290$ | $D_5 = .04125$ | 1.691 | 54.80 | .516 |
| $R_8 = + 6.2500$ | $S_3 =$ variable | | | .511 |
| $R_9 = + 1.2025$ | $D_6 = .0375$ | 1.7618 | 26.98 | .524 |
| $R_{10} = + .7318$ | $D_7 = .075$ | 1.5097 | 64.44 | |
| $R_{11} = \infty$ | $S_4 =$ variable | | | .518 |
| $R_{12} =$ aspheric | $D_8 = .0625$ | 1.48503 | 70.29 | .518 |
| $R_{13} = -3.8225$ | $S_5 = .05$ or $.765$ | | | .514 |
| $R_{14} = -1.2174$ | $D_9 = .0375$ | 1.65695 | 50.81 | .508 |
| $R_{15} = + .4909$ | $D_{10} = .075$ | 1.7618 | 26.98 | |
| $R_{16} = + 1.1742$ | $S_6 = .765$ or $.05$ | | | .513 |
| $R_{17} = + 2.0886$ | $D_{11} = .05$ | 1.7618 | 26.98 | .742 |
| $R_{18} = + .8273$ | $D_{12} = .175$ | 1.61334 | 57.59 | |
| $R_{19} = - 2.0464$ | $S_7 = .0025$ | | | .748 |
| $R_{20} = +10.8029$ | $D_{13} = .075$ | 1.5097 | 64.44 | .745 |
| $R_{21} = - 2.5096$ | | | | .743 |

The aspheric surface $R_{12}$ has radius of curvature $+1.8262F_0$ at the vertex and is defined by the equation:

$$x = (1.8262 - \sqrt{3.3348 - y^2}) - .004135y^4 + .2330y^6 - .2541y^8 + 8.9889y^{10}$$

The dimensions of the variable air spaces in the front assembly are as follows:

|  | $S_1$ | $S_3$ | $S_4$ |
|---|---|---|---|
| $F = F_0$ | .0375 | 1.88225 | .42738 |
| $F = \sqrt{F_0 F_m}$ | 1.31225 | 1.31225 | .075 |
| $F = F_m$ | 1.88225 | .0375 | .42738 |

*Example III*

| Radius | Thickness or Air Separation | Refractive Index $n_d$ | Abbe V Number | Clear diameter |
|---|---|---|---|---|
| $R_1 = +1.9964$ |  |  |  | 1.25 |
|  | $D_1 = .0625$ | 1.7618 | 26.98 |  |
| $R_2 = +1.0849$ |  |  |  |  |
|  | $D_2 = .2125$ | 1.6177 | 49.78 |  |
| $R_3 = -19.1161$ |  |  |  | 1.205 |
|  | $S_1 = $ variable |  |  |  |
| $R_4 = +5.9363$ |  |  |  | .578 |
|  | $D_3 = .0375$ | 1.691 | 54.80 |  |
| $R_5 = +.4401$ |  |  |  |  |
|  | $D_4 = .075$ | 1.7174 | 29.51 |  |
| $R_6 = +1.0484$ |  |  |  | .522 |
|  | $S_2 = .075$ |  |  |  |
| $R_7 = -1.6614$ |  |  |  | .514 |
|  | $D_5 = .0375$ | 1.691 | 54.80 |  |
| $R_8 = +10.1010$ |  |  |  | .518 |
|  | $S_3 = $ variable |  |  |  |
| $R_9 = +1.1659$ |  |  |  | .528 |
|  | $D_6 = .0375$ | 1.7618 | 26.98 |  |
| $R_{10} = +.71014$ |  |  |  |  |
|  | $D_7 = .075$ | 1.5097 | 64.44 |  |
| $R_{11} = \infty$ |  |  |  | .522 |
|  | $S_4 = $ variable |  |  |  |
| $R_{12} = $ aspheric |  |  |  | .522 |
|  | $D_8 = .0625$ | 1.48503 | 70.29 |  |
| $R_{13} = -3.8536$ |  |  |  | .518 |
|  | $S_5 = .05$ or $.7716$ |  |  |  |
| $R_{14} = -1.2288$ |  |  |  | .512 |
|  | $D_9 = .0375$ | 1.65095 | 50.81 |  |
| $R_{15} = +.4955$ |  |  |  |  |
|  | $D_{10} = .075$ | 1.7618 | 26.98 |  |
| $R_{16} = +1.1848$ |  |  |  | .517 |
|  | $S_6 = .7716$ or $.05$ |  |  |  |
| $R_{17} = +2.1073$ |  |  |  | .748 |
|  | $D_{11} = .0425$ | 1.7618 | 26.98 |  |
| $R_{18} = +.8350$ |  |  |  |  |
|  | $D_{12} = .15$ | 1.61334 | 57.59 |  |
| $R_{19} = -2.0653$ |  |  |  | .751 |
|  | $S_7 = .0025$ |  |  |  |
| $R_{20} = +10.9880$ |  |  |  | .749 |
|  | $D_{13} = .0625$ | 1.5097 | 64.44 |  |
| $R_{21} = -2.5082$ |  |  |  | .747 |

The aspheric surface $R_{12}$ has radius of curvature $+1.8431F_0$ at the vertex and is defined by the equation:

$$x = (1.8431 - \sqrt{3.3970 - y^2}) - .01782y^4 + .2107y^6 + .8772y^8 - 1.8819y^{10}$$

The dimensions of the variable air spaces in the front assembly are as follows:

|  | $S_1$ | $S_3$ | $S_4$ |
|---|---|---|---|
| $F = F_0$ | .0375 | 1.8264 | .41675 |
| $F = \sqrt{F_0 F_m}$ | 1.2736 | 1.2736 | .075 |
| $F = F_m$ | 1.8264 | .0375 | .41675 |

In these two tables, again, the linear dimensions are given in terms of $F_0$, the minimum value of the equivalent focal length F of the objective in the lower range of variation. The maximum value $F_m$ in such lower range is $5F_0$, and the minimum and maximum values $F_0^1$ and $F_m^1$ in the higher range are respectively $2F_0$ and $10F_0$.

The relative aperture of the objective is $f/4.0$ for the lower range and $f/8.0$ for the higher range.

Both examples cover a semi-angular field varying from 11½ degrees at minimum focal length $F_0$ to 2½ degrees at maximum focal length $F_m$ in the lower range, and from 5¾ degrees at minimum focal length $F_0^1$ to 1¼ degrees at maximum focal length $F_m^1$ in the higher range.

The iris diaphraghm is located .025 in front of the surface $R_{12}$ in both examples and has diameter $.518F_0$ in Example II and $.522F_0$ in Example III. The back focal distance is $2.908F_0$ in Example II, and $2.929F_0$ in Example III.

In these two examples, the front assembly is substantially afocal throughout the range of movement and comprises three members, of which the front and rear members each consists of a convergent doublet component, whilst the middle member consists of a divergent doublet component followed by a divergent simple component. The movements of these members, controlled by a "zoom" control element, are fully described in the specification of the United States application No. 53,413 (British patent application No. 30,046 of 1959, above mentioned), the divergent middle member being driven at a rate bearing a linear relationship to the movement of the zoom control element in a rearward direction during the change from minimum equivalent focal length to maximum equivalent focal length, and at the same time the front and rear members are driven by the zoom control element through a single cam, so that they first move away from one another and then move back again to their starting positions. The movements are such as to give a rate of change of the equivalent focal length of the whole objective following an approximation to a logarithmic law, whereby the size of the resultant image changes at a relatively steady rate in accordance with the movement of the zoom control element.

In this description, it has been assumed that the object position remains stationary, for example at infinity. Focussing for near object positions can be effected by means of an additional forward movement of the front member of the front assembly under the control of a focussing control element, independently of the zooming movement, for example by mounting the front member adjustably in its mount. If $d_0$ is the distance of the object from the front nodal plane of the front member, the necessary further adjustment of the front member for focussing purposes consists of a forward movement through a distance equal to $f_1^2/(d_0 - f_1)$ where $f_1$ is the equivalent focal length of the front member.

In the examples, the equivalent focal lengths $f_1$, $f_2$ and $f_3$ respectively of the front, middle and rear members of the front assembly are $+3.704F_0$, $-1.031F_0$ and $+3.405F_0$ in Example II, and $+3.553F_0$, $-1.000F_0$ and $+3.289F_0$ in Example III.

The rear assembly in both examples comprises a stationary front member, an adjustable middle member and a stationary rear member. The front member consists of a convergent simple component having an aspheric front surface and has equivalent focal length $f_f$ equal to $+2.557F_0$ in Example II and $+2.580F_0$ in Example III. The adjustable middle member consists of a divergent doublet component having equivalent focal length $f_m$ equal to $-1.011F_0$ in Example II and $-1.020F_0$ in Example III. The stationary rear member consists of a convergent doublet component followed by a convergent simple component, and has equivalent focal length $f_r$ equal to $+1.399F_0$ in Example II and $+1.403F_0$ in Example III.

The divergent middle member is adjustable from one to the other of two preset positions, in one of which it is close to the rear member, whilst in the other it is close to the front member. In these two positions, the magnifications due to the middle member are respectively $\sqrt{M}$ and $1/\sqrt{M}$, where M is the ratio between the equivalent focal lengths of the objective in the two ranges, and since both examples $M = 2$, these magnifications are respectively 1.414 and 0.707. The middle member has the same conjugates in the two positions, the front conjugate distance in one position being equal to the back conjugate distance in the other position. Thus, the two conjugate distances are $f_m(1 + \sqrt{M})$ and $f_m(1 + \sqrt{M})/\sqrt{M}$, that is 2.414 $f_m$ and 1.707 $f_m$, which are equal respectively to 2.441 $F_0$ and 1.726$F_0$ in Example II and to 2.462$F_0$ and 1.741$F_0$ in Example III. The distance between the two preset positions is equal to the difference between the two conjugate distances and is 0.715$F_0$ in Example II and 0.721$F_0$ in Example III. In this way, as has already been mentioned, it becomes possible to get two ranges of variation of the equivalent focal length of the objective, with the same image plane and without movement of the front and rear members of the rear assembly.

The equivalent focal length $F_R$ of the complete rear assembly has the values +2.055$F_0$ in the lower range and +4.110$F_0$ in the upper range in Example II, and +2.074$F_0$ in the lower range and +4.148$F_0$ in the upper range in Example III.

Since the $f$/number of the objective in both examples is 4.0 in the lower range and 8.0 in the higher range, the product of $f_m$ and the $f$/number is −4.044$F_0$ in the lower range and −8.088$F_0$ in the upper range in Example II and −4.080$F_0$ and −8.160$F_0$ in the two ranges in Example III, i.e. −1.97$\overline{F_R}$ in both examples for both ranges. Again, since $\overline{F_0 F_m}$ has the value 2.236$F_0$ in both examples, the said product is −1.81$\sqrt{F_0 F_m}$ in Example II and −1.82$\sqrt{F_0 F_m}$ in Example III for both ranges.

The expression $$\frac{1}{f_m(1+\sqrt{M})}$$

has the value −0.41/$F_0$ in both examples and the equivalent power of the front member of the rear assembly 1/$f_t$ has the value 0.39/$F_0$ in both examples.

The divergent middle member of the rear assembly is substantially achromatic and has a collective internal contact, the difference between the Abbe V number of the materials bounding such contact being about 24 in both examples, whilst the difference between their mean refractive indices is .105.

The convergent rear member of the rear assembly is substantially achromatic and the internal contact in the doublet component thereof is dispersive with radius of curvature equal to .59$f_r$ in both examples. The materials of the two elements in such component have mean refractive indices differing by .15 and Abbe V numbers differing by 30.6 in both examples.

As is explained in greater detail in the specifications of the applications above mentioned, both examples give good correction for the primary aberrations throughout the movements in both ranges, the second example being preferable to the first for near object distances.

It should be mentioned that the use of an adjustable member in the rear assembly to effect transfer from one range of focal length variation to the other gives rise to a further advantage, in addition to those already mentioned, in that the back focal distance is materially greater than that obtained for the shorter range in prior known arrangements. Under certain conditions, this permits the insertion of reflectors in the path of the rays between the rear surface of the objective and the image plane. This can be utilized to locate the image plane in a more convenient position for example to enable the overall size of the complete apparatus to be reduced. Thus, for instance, the image plane can be positioned at one side of the main objective, and in television equipment in particular considerable economy in overall length can be effected in this way by disposing the pick-up cathode ray tube, which itself usually has considerable length, alongside the objective.

It will be clear that the foregoing examples have been described by way of example only and may be modified in various ways within the scope of the invention. Thus, for instance, the front assembly may be arranged in other ways, with different relative movements between its members, to effect variation of equivalent focal length in each range. In some of such modifications, the front assembly as a whole may be convergent, instead of divergent, and may form its image in a constant position behind the front surface of the rear assembly. In such case, the front member of the rear assembly can be less powerful and may for instance consist merely of a single element or may even be dispensed with altogether.

What I claim as my invention and desire to secure by Letters Patent is:

1. A variable focal length optical objective, comprising front and rear assemblies, the front assembly including members relatively movable for effecting variation of the equivalent focal length of the objective whilst maintaining constant position of the resultant image plane of the objective throughout the range of relative movement, and the rear assembly including a stationary front member, a convergent stationary rear member, an adjustable divergent member located between such front and rear members, and means for axially adjusting such divergent member from one to the other of two preset positions in which such divergent member has the same conjugates, whereby in such two preset positions of the divergent member the relative movement of the members of the front assembly will produce two different ranges of variation of the equivalent focal length of the complete objective with the same position of the resultant image plane, the magnifications of the divergent member of the rear assembly in its two preset positions respectively being $\sqrt{M}$ and $1/\sqrt{M}$, where M is the ratio between the two values of the equivalent focal length of the objective respectively when the divergent member of the rear assembly is occupying its two preset positions without change of position of the movable members of the front assembly, the stationary front member of the rear assembly having equivalent power lying between ⅔ and ⅗ times the value of the expression $$\left(\frac{1}{d}-\frac{1}{f_m(1+\sqrt{M})}\right)$$

where $f_m$ is the equivalent focal length of the divergent member in the rear assembly, and $d$ is the distance of the image formed by the front assembly from the front surface of the rear assembly (such distance being reckoned positive if the said image is in front of such front surface and negative if it is behind such front surface, while an equivalent focal length is reckoned positive if convergent and negative if divergent).

2. A variable focal length optical objective as claimed in claim 1, in which the image formed by the front assembly lies in front of the front surface of the rear assembly, the front member of the rear assembly being convergent and comprising a doublet component having a dispersive internal contact.

3. A variable focal length optical objective as claimed in claim 2, in which the front assembly has finite equivalent focal length and the equivalent focal length of the divergent member in the rear assembly multiplied by the $f$/number of the complete objective lies between $d/R$ and $4d/R$, where R is the ratio between the equivalent focal length of the front assembly and the equivalent focal length of the complete objective.

4. A variable focal length optical objective as claimed in claim 3, in which the adjustable divergent member in the rear assembly is substantially achromatic and includes at least one divergent element and at least one convergent element, the Abbe V number of the material of the divergent element exceeding that of the convergent element by at least 15, such adjustable divergent member having its front surface concave to the front and its rear surface convex to the front and including a collective internal contact which is convex to the front and has effective radius of curvature lying between ⅓ and ¾ of the numerical value of the equivalent focal length of such adjustable divergent member, the difference between the mean refractive indices of the materials of the elements bounding such internal contact lying between 0.2 and 0.05.

5. A variable focal length optical objective as claimed in claim 4, in which the convergent rear member in the rear assembly is substantially achromatic and includes at least one convergent element at least one divergent element, the Abbe V number of the material of the convergent element exceeding that of the divergent element by at least 20, such convergent rear member including a dispersive internal contact which is convex to the front and has effective radius of curvature lying between 1/3 and 3/4 of the equivalent focal length of the convergent rear member, the difference between the mean refractive indices of the materials of the elements bounding such internal contact lying between 0.25 and 0.05.

6. A variable focal length optical objective as claimed in claim 1, in which the adjustable divergent member and the convergent rear member in the rear assembly are each substantially achromatic and includes at least one divergent element and at least on convergent element, such divergent member including a collective internal contact convex to the front, and such convergent member including a dispersive internal contact convex to the front.

7. A variable focal length optical objective as claimed in claim 1, in which the adjustable divergent member in the rear assembly consists of a substantially achromatic doublet component having a collective internal contact convex to the front, and the convergent rear member in the rear assembly is substantially achromatic and consists of a doublet component having a dispersive internal contact convex to the front and a simple component behind such doublet component.

8. A variable focal length optical objective as claimed in claim 1, in which the front assembly has finite equivalent focal length and the equivalent focal length of the divergent member in the rear assembly multiplied by the $f$/number of the complete objective lies between $d/R$ and $4d/R$, where R is the ratio between the equivalent focal length of the front assembly and the equivalent focal length of the complete objective.

9. A variable focal length optical objective as claimed in claim 1, in which the front assembly is substantially afocal and the equivalent focal length of the divergent member in the rear assembly multiplied by the $f$/number of the complete objective lies between $-F_R$ and $-4F_R$, where $F_R$ is the equivalent focal length of the rear assembly (an equivalent focal length being reckoned as positive if convergent and negative if divergent).

10. A variable focal optical objective as claimed in claim 1, in which the equivalent focal length of the divergent member in the rear assembly multiplied by the $f$/number of the complete objective lies between 1 and 4 times the negative value of the square root of the product of the maximum and minimum values in the range of variation of the equivalent focal length of the complete objective.

11. A variable focal length optical objective, comprising front and rear assemblies, the front assembly including members relative movable for effecting variation of the equivalent focal length of the objective while maintaining constant position of the resultant image plane of the objective throughout the range of relative movement, and the rear assembly including a convergent stationary rear member, an adjustable divergent member located in front thereof, and means for adjusting such divergent member from one to the other of two preset positions in which such divergent member has the same conjugates, whereby in such two preset positions of the divergent member the relative movement of the members of the front assembly will produce two different ranges of variation of the equivalent focal length of the complete objective with the same position of the resultant image plane, the magnifications of the divergent member of the rear assembly in its two preset positions respectively being $\sqrt{M}$ and $1/\sqrt{M}$, where M is the ratio between the equivalent focal lengths of the objective in the two ranges, the adjustable divergent member in the rear assembly being substantially achromatic and including at least one convergent element, the Abbe V number of the material of the divergent element exceeding that of the convergent element by at least 15, such adjustable divergent member having its front surface concave to the front and its rear surface convex to the front and including a collective internal contact.

12. A variable focal length optical objective as claimed in claim 11, in which the collective internal contact in the adjustable divergent member of the rear assembly is convex to the front and has effective radius of curvature lying between 1/3 and 3/4 of the numerical value of the equivalent focal length of such adjustable divergent member, the difference between the mean refractive indicies of the materials of the elements bounding such internal contact lying between 0.2 and 0.05.

13. A variable focal length optical objective as claimed in claim 12, in which the convergent rear member in the rear assembly is substantially achromatic and includes at least one convergent element and at least one divergent element, the Abbe V number of the material of the convergent element exceeding that of the divergent element by at least 20, such convergent rear member including a dispersive internal contact which is convex to the front and has effective radius of curvature lying between 1/3 and 3/4 of the equivalent focal length of the convergent rear member, the difference between the mean refractive indices of the materials of the elements bounding such internal contact lying between 0.25 and 0.05.

14. A variable focal length optical objective as claimed in claim 11, in which the front assembly has finite equivalent focal length and the equivalent focal length of the divergent member in the rear assembly multiplied by the $f$/number of the complete objective lies between $d/R$ and $4d/R$, where R is the ratio between the equivalent focal length of the front assembly and the equivalent focal length of the complete objective.

15. A variable focal length optical objective as claimed in claim 11, in which the front assembly is substantially afocal, and the equivalent focal length of the divergent member in the rear assembly multiplied by the $f$/number of the complete objective lies between $-F_R$ and $-4F_R$, where $F_R$ is the equivalent focal length of the rear assembly (an equivalent focal length being reckoned as positive if convergent and negative if divergent).

16. A variable focal length optical objective as claimed in claim 11, in which the equivalent focal length of the divergent member in the rear assembly multiplied by the $f$/number of the complete objective lies between 1 and 4 times the negative value of the square root of the product of the maximum and minimum values in the range of variation of the equivalent focal length of the complete objective.

References Cited in the file of this patent

UNITED STATES PATENTS

| 2,179,850 | Glancy | Nov. 14, 1939 |
| 2,906,172 | Klemt | Sept. 29, 1959 |

FOREIGN PATENTS

| 449,434 | Great Britain | June 26, 1936 |